United States Patent

[11] 3,574,279

[72] Inventor Andrew W. Smith, Jr.
Pittsburgh, Pa.
[21] Appl. No. 003,579
[22] Filed Jan. 8, 1970
Continuation of Ser. No. 702,713,
Feb. 2, 1968, abandoned
[45] Patented Apr. 13, 1971
[73] Assignee Westinghouse Electric Corporation
Pittsburgh, Pa.

[54] PREDICTIVE GAUGE CONTROL METHOD AND APPARATUS WITH AUTOMATIC PLASTICITY DETERMINATION FOR METAL ROLLING MILLS
15 Claims, 4 Drawing Figs.
[52] U.S. Cl. .................................................. 72/7, 72/11, 72/16
[51] Int. Cl. .................................................. B21b 37/02, B21b 37/08
[50] Field of Search .......................................... 72/7, 8—11, 16, 21

[56] References Cited
UNITED STATES PATENTS
3,312,092 4/1967 Neumann .................. 72/13
3,332,263 7/1967 Beadle et al. .................. 72/7
3,194,036 7/1965 Canfor et al. .................. 72/11
3,289,444 12/1966 Takuma ........................ 72/7
3,416,339 12/1968 List .............................. 72/8
3,355,918 12/1967 Wallace ........................ 72/16

Primary Examiner—Milton S. Mehr
Attorneys—F. H. Henson, R. G. Brodahl and E. F. Possessky ABSTRACT: A programmed computer control system provides online predictive roll force gauge control and screwdown offset gauge control for a tandem hot steel strip mill. A gauge control program calculates corrective screwdown movement including that predictively required at each gauge-controlled stand for optimum or near optimum gain correction of roll force error on the basis of online detected roll force and screwdown position values at that stand and on the basis of a mill spring constant which is predetermined for that stand and a workpiece plasticity value which is automatically determined from roll force and workpiece entry and delivery gauges at that stand. The control system operates the mill screwdowns in accordance with the program calculations.

PREDICTIVE GAUGE CONTROL METHOD AND APPARATUS WITH AUTOMATIC PLASTICITY DETERMINATION FOR METAL ROLLING MILLS

This is a continuation of application Ser. No. 702,713, filed Feb. 2, 1968.

CROSS REFERENCE TO RELATED APPLICATIONS

Reference is made to the following copending applications:

Ser. No. 455,111 entitled "Slave Gauge Control System For A Rolling Mill," filed by J. Wallace on May 12, 1965, and issued as U.S. Pat. No. 3,357,217 on Dec. 12, 1967.

Ser. No. 499,493 entitled "Temperature Control System And Method For Operating A Reduction Rolling Mill," filed by J. W. Cook on Oct. 21, 1965, and issued as U.S. Pat. No. 3,418,834 on Dec. 31, 1968.

Ser. No. 686,783 entitled "Predictive Gauge Control Method And Apparatus For Metal Rolling Mills" and filed by C. W. Eggers and K. E. Csonka for J. C. Csonka on Nov. 29, 1967.

Ser. No. 678,367 entitled "Automatic Gauge Control System With An Adaptive Gain Loop," filed by A. V. Silva on Oct. 26, 1967, and issued as U.S. Pat. No. 3,492,844 on Feb. 3, 1970.

Ser. No. 774,638 entitled "Predictive Gauge Control Method And Apparatus With Adaptive Plasticity Determination For Metal Rolling Mills" and filed by A. W. Smith, Jr. on Nov. 12, 1968.

Ser. No. 677,308 entitled "Screwdown Offset System and Method for Improved Gauge Control," filed by A. W. Smith, Jr. on Oct. 23, 1967 and filed as continuation Ser. No. 872,461 on Nov. 24, 1969.

BACKGROUND OF THE INVENTION

The present invention relates to metal rolling mills and more particularly to roll force gauge control systems and methods used in operating such mills.

In the operation of a metal or steel reversing or tandem rolling mill, the unloaded roll opening and the speed at each tandem mill stand or for each reversing mill pass are set up by the operator or by a computer to produce successive workpiece (strip or plate) reductions resulting in work product at the desired gauge. Generally, the loaded roll opening at a stand equals the stand delivery gauge on the basis of the usually justifiable assumption that there is little or no elastic workpiece recovery.

Since the setup conditions can be in error and since in any event certain mill parameters affect the stand loaded roll opening during rolling and after setup conditions have been established, a stand gauge control system must be employed if it is necessary that the stand delivery gauge be closely controlled. Thus, at the present state of the rolling mill art and particularly the steel rolling mill art, a stand gauge control system is normally used for a reversing mill stand and for predetermined stands in tandem rolling mills.

More particularly, the well-known gaugemeter or roll force system has been widely used to produce stand gauge control in metal rolling mills and particularly in tandem hot steel strip rolling mills and reversing plate mills where experience has demonstrated that roll force control is particularly effective. Earlier publications and patents such as U.S. Pat. No. 2,726,540, issued Dec. 13, 1955 to R. B. Sims describe the theory upon which operation of the roll force system is based.

Briefly, the roll force gauge control system uses Hooke's law in controlling the screwdown position at a rolling stand, i.e. the loaded roll opening under workpiece rolling conditions equals the unloaded roll opening (screwdown position) plus the mill spring stretch caused by separating force applied to the rolls by the workpiece. To embody this rolling principle in the roll force gauge control system, a load cell or other force detector measures the roll separating force and the screwdown position is controlled to balance roll force changes from a reference value and thereby hold the loaded roll opening at a substantially constant value. The following formula expresses the basic relationship:

Equation (1) $$h = S_o + \frac{F}{H}$$

where:
$h$ = loaded roll opening (output workpiece thickness)
$S_o$ = unloaded roll opening (screwdown position)
$K$ = mill spring constant
$F$ = roll separating force.

Typically, the roll force gauge control system is an analog arrangement including analog comparison and amplification circuitry which responds to roll force and screwdown position signals to control the screwdown position and hold the following equality:

Equation (2) $$S = \frac{-\Delta F}{K}$$

where:
$\Delta F$ = measured change in roll force from a force reference
$\Delta S$ = controlled change in screwdown position from a screwdown reference.

After the unloaded roll opening setup and the stand speed setup are determined by the mill operator or the mill computer for a particular workpiece pass or series of passes, the rolling operation is begun and the screwdowns are controlled to regulate the workpiece delivery gauge from the reversing mill stand or from each roll force controlled tandem mill stand. By satisfying Equation (2), and the assumptions implicit in Equation (1), the loaded roll opening $h$ in Equation (1) is maintained constant or nearly constant.

Since the roll force gauge control system functions without sensing actual stand delivery gauge, screwdown offset is required for the roll force gauge-controlled screwdowns during rolling operation to correct steady state mill delivery gauge errors which stem from various causes. By screwdown offset, it is herein meant to refer to a change in screwdown position made to correct a gauge error which is caused or expected to be caused by a single mill variable or by a combination of mill variables and which is uncorrectable or inadequately correctable by internal roll force gauge control operation alone. By steady state gauge error, it is meant to refer to an error which is correctable by screwdown offset.

One mill condition which can cause steady state gauge error is an incorrect setup. Thus, the screwdown position and the stand speed setup at a particular stand results in a head end stand delivery gauge which may or may not equal the head end gauge predicted from the setup values. If the roll force control uses a head end lock on roll force reference, the stand is roll force controlled to continue rolling the actual head end gauge unless the screwdowns are externally offset to produce the correct steady state gauge.

If the roll force control uses an absolute roll force setup reference, the stand is roll force controlled to operate from the setup roll force and this operating condition may result in correct steady state gauge since the initial screwdown position is changed to correct any initial roll force error. However, use of an absolute roll force setup reference can result in erroneous steady state stand delivery gauge which requires screwdown offset, particularly if the initial screwdown position calibration has drifted or if the mill spring constant has a value different from the value assumed in the setup calculation. Since screwdown calibration drift and/or a changed mill spring constant directly affect steady state gauge, a screwdown offset may be required if a change occurs in either or both of these variables during workpiece rolling following a correct setup.

The initial screwdown position calibration is a direct electromechanical measurement technique made at the beginning of work roll life and if desired new "initial" calibrations are made at various subsequent time points in the work roll life. In any case, the predetermined initial screwdown calibration is subject to change during mill operation and any such change requires screwdown offset for correction of the roll force control operation. Typically, calibration drift is caused by changes in roll stand heating, stand speed (bearing oil film thickness), roll wear, differential leveling operation of the screwdowns for shape control and possibly by changes in other mill conditions.

When the initial screwdown calibration does drift, changes occur in the screwdown position at which roll facing occurs thereby making the unloaded roll opening correspondence with screwdown position differ from the initial correspondence by the amount of the calibration drift. As a result, the actual loaded roll opening, i.e. the actual gauge, differs from the expected value calculated with the use of an unloaded roll opening which is based on the erroneous calibration. The difference represents a gauge error condition which is correctable by a screwdown offset or, more specifically, a screwdown recalibration. If the mill spring constant changes, the actual loaded roll opening differs from the expected value calculated with the use of a mill stretch which is based on the erroneous mill spring constant, and the resultant gauge error condition is normally similarly correctable by a screwdown offset.

Other mill variables may cause steady state gauge errors which require corrective screwdown offset. For example, in a hot strip steel mill where strip temperature rundown from the start of the strip to the end of the strip tends to cause heavy gauge runup, the stand gauge controls may not react fast enough to correct the running or steady state gauge error and as a consequence screwdown offset is needed to make the correction. As another example, elasticity of the workpiece material can be sufficient to result in slightly heavy workpiece gauge even though the roll force gauge control accurately holds the loaded roll opening at the desired value. Gauge heaviness of this kind would be due to the fact that the workpiece reduction is largely plastic and at least partly elastic, and it may require corrective screwdown offset in those cases where it has relative significance.

In the case of mill acceleration or deceleration, steady state gauge apparently changes or tends to change as a result of transient changes in stand entry and exit workpiece tension values which are reflected in rapid roll force changes that cannot be tracked by the roll force controls. It is possible, however, that rate of workpiece speed changes could cause transient calibration changes or transient mill spring constant changes or otherwise have an effect on gauge which is independent of roll force. In any event, screwdown offset is required for steady state correction of gauge error effects produced by a sustained workpiece speed change rate.

To provide steady state gauge error correction, the well-known monitor gauge control system is usually employed to produce screwdown offset for the roll force controls. In the monitor system, an X-ray or other radiation gauge is placed at one or more predetermined process points and usually at least at a process point following the delivery end of the mill in order to sense actual delivery gauge after a workpiece transport delay from the point in time at which the actual delivery gauge is produced at the preceding stand or stands. The monitor system compares the actual delivery gauge with the desired gauge and develops an analog feedback control signal to adjust the operation of the reversing mill roll force gauge control system or one or more predetermined tandem mill stand roll force gauge control systems to supply desired steady state mill delivery gauge. In this manner, the conventional monitor system provides for transport delayed correction of steady state gauge errors which are caused or which are tending to be caused by a single mill variable or by a combination of mill variables.

In operator-controlled mills, some steady state gauge correcting load can eventually be taken off the monitor system by screwdown recalibration, by adjustment of individual stand gain setting, etc. between workpiece passes of steady state gauge error tends to exist along the entire workpiece and persists from workpiece to workpiece. In this manner, some reduction is achieved in the length of off gauge workpiece material otherwise associated with monitor transport delay. Similarly, corrective monitor system operation caused by head end gauge errors can be reduced by changes in the operator setup from workpiece to workpiece or more accurately and more quickly by programmed updating of the mill setup program if a mill setup computer is employed.

Experience with conventional roll force gauge control systems has demonstrated that the achievement of fast and accurate mill delivery gauge control with stability is a complicated and often very difficult task under the wide variety of rolling conditions and types and sizes of workpieces or strips encountered in metal rolling mills. It is particularly desirable that stand gauge control be performed fast since even a relatively short response time period can result in a substantial length of off gauge although not necessarily rejectable gauge work product at high delivery speed. Thus particularly in tandem hot strip mills, strip delivery gauge accuracy is affected materially by the speed and the stability of stand gauge control because these factors determine the length of strip over which a gauge error persists. Delivery and stand gauge accuracies of course also depend on factors such as transport delay, accuracy of sensors, etc.

The roll force gauge control response speed depends principally on the system gain of the roll force gauge control, i.e. the rate of controlled screwdown movement per unit of detected roll force error (or other input error such as monitor error feedback). Since stand delivery gauge is determined by the intersection point of the mill spring curve (roll force versus roll opening) with the workpiece deformation curve (yield force versus thickness reduction), the total amount of screwdown movement required to correct a roll force error (or other detected error) depends primarily on the mill spring constant and the workpiece plasticity. The workpiece plasticity and the mill elasticity thus affect the rate at which corrective control actions should be applied, i.e. the system gain.

In conventional mill operation involving analog-type roll force gauge control, an attempt is made to set the roll force gauge control system gain on the basis of a predetermined mill spring constant and the expected workpiece plasticity in order to produce corrective screwdown movement along the fastest nonovershoot screwdown position versus time curve. For convenience of description, the term workpiece plasticity is herein intended to refer to the magnitude of the slope of the roll force versus workpiece deformation (reduction) curve. On the basis of this definition, the width of the workpiece affects the workpiece plasticity since the roll force required for a particular reduction depends on the workpiece width.

If the system gain is tuned to a value which is too small, the control produces very stable overdamped screwdown operation with excessive correction time. On the other hand, if the system gain is turned to a value too large, underdamped overcorrections or hunting can result and in some cases unstable screw runaway can occur.

Optimum or 100 percent gain turning requires critical system damping and it produces the fastest stable nonovershoot screwdown response that the conventional analog-type roll force gauge control system is capable of providing. However, in analog roll force control practice a 100 percent gain tuning condition has been difficult to achieve particularly on a continuous operating basis, and in many cases mill operators conservatively undertune the analog-type control at about 90 percent in order to avoid the development of overtuning conditions causes by changes in mill parameters which affect the tuning condition. For example, changes in workpiece plasticity caused by factors such as skid marks or temperature rundown typically produce turning changes within a band as great as ±10 percent or more about the preset tuning condition corresponding to the preset system gain of the roll force gauge control system.

Some improvement in tandem mill delivery gauge control has been realized by subjecting the screwdown control of one or more stands to roll force control from an earlier stand. Improved gain tuning is thereby achieved in an effective sense as more fully described in the previously noted Wallace application. However, the Wallace slave-type control is more or less limited to certain conditions such as skid marks under which the effective improvement in gain tuning is provided. There has also been some effort made to improve gain tuning by placing the roll force system gain under limited monitor feedback control as set forth in the above Silva application, but this approach involves the inherent monitor limitation of transport delay.

As already indicated, the principal mill parameters considered in turning the gain are the mill spring constant and the workpiece plasticity. Accordingly, changes in these parameters are typically involved in gain tuning variations which occur during conventional roll force gauge controlled rolling mill operation with adverse effect on stand gauge control speed and accuracy and in some cases with adverse effect on stand gauge control stability.

The mill spring curve has typically and usually justifiably been treated as having a constant and uniform linear slope and is therefore commonly referred to as a spring line. Actually, at lower force levels which typically have been encountered infrequently in mill use, the spring curve is nonlinear and the spring constant accordingly varies over the nonlinear portion of the curve. Without reflection of operating changes in the mill spring constant in the operation of the roll force gauge control particularly in the newer tandem hot strip mills which are designed to operate over wider roll force ranges to accommodate a greater range of strip widths, the gain tuning condition and in turn stand gauge control speed and accuracy are adversely affected.

It is also significant that the spring constant corresponding to the slope of the linear part of the spring curve is subject to change during mill operation. On the basis of present knowledge, the slope of the linear portion of the spring curve can be changed (perhaps as much as ±10 percent by individual changes or combinations of changes in certain mill parameters including the backup roll diameter and the workpiece width. Since the workpiece width and the backup roll diameter values are known or detected at the beginning of a workpiece pass and normally would not change during the pass, they would normally not cause in process changes in the mill spring constant. However, without reflection of changes in the slope of the linear part of the mill spring curve possibly caused by other variables during operation of the roll force gauge control, gain tuning and stand gauge control speed and accuracy are adversely effected as in the case of uncorrected operation over the nonlinear portion of the mill spring curve. Change in the mill spring constant can also directly cause steady state gauge error which can be corrected by screwdown offset as previously described.

In some cases, the mill may be under computer or operator setup control to reflect changes in the spring constant through the stand screwdown position setup value from setup calculations to setup calculation. However, this scheme has little or no bearing on the capability of the roll force gauge control to reflect in process changes in the spring constant in online gauge control operation.

Workpiece plasticity variations probably constitute the most significant online source of changes in the gain tuning condition. During conventional computer or operator controlled mill setup for each workpiece pass, the workpiece deformation curve is estimated for a particular workpiece through a particular stand and a fixed value or setting is then determined for the stand gain. Thus, at best, conventional mill setup operation involves only generalized adjustment for workpiece plasticity variations. Typically, no use is made of the previously noted monitor feedback scheme for analog roll force system gain adjustment and instead a "hardness" dial or the like is made available at each roll force gauge controlled stand in order to provide for operator adjustment of roll force gauge control system gain in the gain tuning setup procedure. The gain is set at a value which gives the analog system tuning condition desired, usually a conservative tuning condition of about 90 percent or so to allow for gain tuning variations as previously described. Without in process reflection of plasticity changes from the estimated workpiece plasticity in the operation of the roll force gauge control, gain tuning and stand gauge control speed and accuracy are adversely affected.

Various mill parameters can cause the workpiece plasticity to differ from the estimated value. More particularly, the slope of the deformation curve, i.e. the plasticity, depends on workpiece width as previously indicated and, further, it depends on workpiece thickness and temperature.

The type of material from which the workpiece is formed is also a basic determinant of workpiece plasticity and slight variations in material makeup can thus cause differences in the estimated and actual plasticity values. Similarly, the stand speed can affect the gain tuning condition and gauge control speed and accuracy either independently or intermediately through the workpiece plasticity characteristic by causing plasticity variation, i.e. because the workpiece yield stress is a function of the strain rate (roll biting rate as determined by roll speed).

Insofar as the plasticity variable is concerned, the gain tuning condition changes with workpiece plasticity changes from workpiece to workpiece as well as along the length of a particular workpiece. For example, in a hot steel strip mill, the strip typically has the previously considered short longitudinally spaced portions called skid marks which cause gain tuning changes because they are cooler and harder than the rest of the strip. As another example, the roll force gauge control system gain at a late stand typically must have a value greater than that at an early stand to provide equal or nearly equal gain tuning conditions at the two stands since a later stand typically operates on substantially thinner harder material having a steeper deformation slope and thus requires as much as 8 to 10 times more screwdown movement than an early stand to correct a unit gauge error in the same workpiece material.

As an illustration of the effects of a changing mill spring constant or changing workpiece plasticity on the gain tuning condition, assume that under one rolling condition the spring constant or the workpiece plasticity has one value and under a second rolling condition it has a second value as developed during an uninterrupted rolling operation without any change in the analog-type roll force gauge control system gain. The control system gain setting may produce 100 percent tuning under the first condition and could well produce only 90 percent tuning under the second condition. Thus, overall gauge control performance is diminished as a result of the occurrence of the second condition. Although some previous mills have involved the use of a workpiece width signal in providing analog system gain compensation for changes in the mill spring constant and the workpiece plasticity caused by workpiece width changes from workpiece to workpiece, such compensation does not affect the gauge control performance when other parameters such as the roll force operating range or the workpiece temperature cause changes in the gain tuning condition.

If the analog or any other type roll force gauge control is too slow to correct a transient gauge error caused by any one or more casual variables, that error will persist to the delivery end of the mill unless it is corrected by an intervening rolling operation. Since the conventional monitor system cannot correct a delivered transient gauge error, it is particularly desirable that stand gauge control be fast for fast and accurate transient gauge error correction. However, conventional analog-type controls have been limited in this respect by the described limitations on gain tuning adaptability which is required for faster and more accurate gauge control.

Although the conventional monitor system cannot correct delivered transient gauge errors, it does ultimately correct with transport delay unanticipated steady state gauge errors which are caused to accumulate at the delivery end of the mill by screwdown calibration changes and other causes as previously described. However, in addition to being limited in transient gauge control speed and accuracy per se, conventional gauge control schemes are limited in performance by excessive requirements for transport-delayed monitor corrections of steady state gauge errors that might otherwise be corrected without transport delay by improved on line roll force gauge control operation.

As summarized in the aforementioned Eggers and Csonka application, the present state of roll force gauge control metal rolling mill technology encompasses reasonably advanced and commercially developed gauge control concepts which have produced generally adequate performance. However, substantial opportunity has existed for material improvement in gauge control speed, accuracy and stability because the very nature of conventional roll force gauge control systems has limited the extent to which they can be modified to produce further gauge control improvement.

In the Eggers and Csonka application itself, there is described a predictive roll force gauge control which departs from the previous prior art and provides for basic improvement in rolling mill operation. The improvement generally stems from improved roll force gauge control made possible by predictive feedforward screwdown control. More particularly, the improvement results from better roll force gain tuning control made possible by the use of online determinations of mill spring constant and workpiece plasticity values.

In specifically implementing the Eggers and Csonka control concept, workpiece plasticity determinations are made online from computer-stored table values. Plasticity determination is thus predictive in nature, and the extent to which improvement is realized by Eggers and Csonka over the previous prior art is limited by the convenience and the accuracy with which predictive plasticity table values can be determined and organized for online use. For example, in a reversing plate mill, it may be very inconvenient and it may be expensive from a computer hardware standpoint to require predictive plasticity tables which would cover all the variety of products and drafting schedules typically characteristic to such a mill. As another example, predictive tabled plasticity values for a strip being processed through a hot tandem steel strip mill may differ from actual values for any one or any combination of a variety of reasons such as the fact that the strip material has a different makeup and different properties from its programmed characteristics, and as a consequence rolling stand gain tuning may differ from time to time or persistently from the 100 percent value during rolling of the strip.

SUMMARY OF THE INVENTION

In accordance with the broad principles of the present invention, a system and method for controlling gauge in operating a metal rolling mill employs means for detecting the roll force and means for controlling screwdown position at each of one or more predetermined rolling stands of the mill. Means are also provided for determining the total amount of screwdown movement (position change) predictively required to correct an error condition representing gauge error at predetermined mill spring constant and workpiece plasticity values. The screwdown position controlling means positions the screwdowns with a system gain and a position-time profile dependent on the amount of predictively defined screwdown movement.

A digital computer system is preferably employed to make the screwdown movement predictions as well as to perform other mill control functions. The computer employs a programming system including a gauge control program which is executed at predetermined intervals to calculate the total predicted screwdown movement required at each gauge controlled stand for gauge correction including that stemming from the detected error condition at that stand. Screwdown movement for correcting the error condition is made at each controlled stand on the basis of calculations which use a predetermined mill spring constant and an automatically determined workpiece plasticity value for that stand. Plasticity is automatically determined, i.e. from roll force and workpiece stand entry and delivery gauge, thereby enabling greater accuracy and/or convenience in workpiece plasticity prediction and, particularly in roll force stand gauge controls, improved control over gain tuning. In turn, better gauge control performance and improved mill operation are realized.

It is therefore an object of the invention to provide a novel gauge control system and method for operating a metal rolling mill to produce work product with improved gauge uniformity and with improved productivity.

It is another object of the invention to provide a novel gauge control system and method for operating a metal rolling mill with improved roll force gauge control speed, accuracy and stability.

An additional object of the invention is to provide a novel roll force gauge control system and method for operating a metal rolling mill with improved transient and steady state gauge control.

Another object of the invention is to provide a novel roll force gauge control system and method for operating a metal rolling mill with improved gauge control capability which makes use of more accurately and/or more conveniently determined workpiece plasticity values.

It is an additional object of the invention to provide a novel roll force gauge control system and method for operating a metal rolling mill with improved online control of stand gain tuning.

Another object of the invention is to provide a novel roll force gauge control system and method for operating a metal rolling mill with improved predictive online gauge control for which workpiece plasticity values are automatically determined from online process measurements.

These and other objects of the invention will become more apparent upon consideration of the following detailed description along with the attached drawings.

DESCRIPTION OF THE PREFERRED EMBODIMENT

Figure 1:
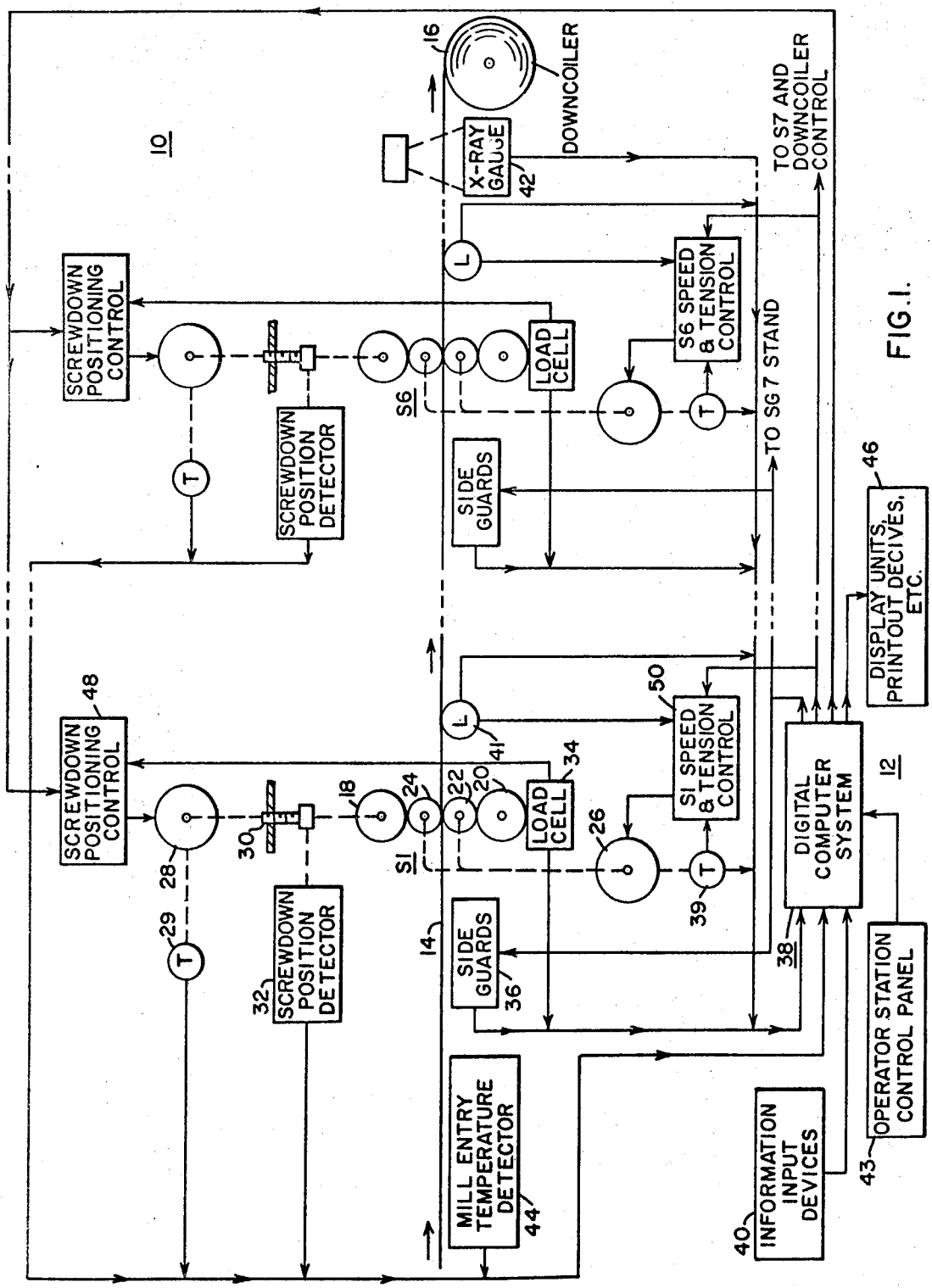
FIG. 1 shows a schematic diagram of a tandem hot steel strip rolling mill and a computer gauge control system therefor arranged for operation in accordance with the principles of the invention.

More specifically, there is shown in FIG. 1 a tandem hot strip steel finishing mill 10 operated with improved gauge control performance by a process control system 12 in accordance with the principles of the invention. Generally, however, the invention is applicable to various types of mills in which roll force gauge control is employed. Thus, the invention can be suitably adapted for application in hot steel plate reversing and other rolling mills.

The tandem mill 10 includes a series of reduction rolling stands S1 through S7 with only two of the stands S1 and S6 shown. A workpiece 14 enters the mill 10 at the entry end in the form of a bar and it is elongated as it is transported through the successive stands S1—S7 to the delivery end of the mill where it is coiled as a strip on a downcoiler 16. The entry bar would be of known steel grade and it typically would have a thickness of about 1 inch and a width within some limited range such as 20 inches to 80 inches. The delivered strip would usually have approximately the same width and a thickness based upon the production order for which it is intended.

In the reduction rolling process, the successive stands operate at successively higher speeds to maintain proper workpiece flow. Each stand produces a predetermined reduction or draft such that the total mill draft reduces the entry bar to strip with the desired gauge.

Each stand is conventionally provided with a pair of work rolls 22 and 24 between which the workpiece 14 is passed. A large DC drive motor is controllably energized at each stand to drive the corresponding work rolls at a controlled speed.

As previously described, the sum of the unloaded work roll opening and the mill stretch substantially defines the workpiece gauge delivered from any particular stand in accordance with Hooke's law. To vary the unloaded work roll opening at each stand, a pair of screwdown motors 28 (only one shown at each stand) position respective screwdowns 30 (only one shown at each stand) which clamp against opposite ends of the backup rolls and thereby apply pressure to the work rolls. Normally, the two screwdowns 30 at a particular stand would be in identical positions, but they can be located in different positions for strip guidance during threading, for flatness or other strip shape control purposes or possibly for other purposes.

A conventional screwdown position detector or encoder 32 provides an electrical representation of screwdown position at each stand. To provide an absolute correspondence between the screwdown position and the unloaded roll opening between the associated work rolls, a screwdown position detection system which includes the screwdown position detector 32 can be calibrated from time to time in the manner previously described.

It is noted that screwdown calibration is to be distinguished from electrical screwdown system calibration which is directed to determining proper electrical representations for screwdown position and roll force. Thus, electrical calibration is obtained when the roll force required to cause a given mill stretch causes an electrical representation which is equal but opposite to the electrical representation obtained from the screwdown position detector 32 when the screwdowns are run to obtain a loaded roll opening change equal to the mill stretch.

Roll force detection is provided at each of predetermined stands by a conventional load cell 34 which generates an electrical analog signal. At the very least, each roll force controlled stand is provided with a load cell 34 and in many cases stands without roll force gauge control would also be equipped with load cells. The number of stands to which roll force gauge control is applied is predetermined during the mill design in accordance with cost-performance standards, and increasingly there is a tendency to apply roll force gauge control to all of the stands in a tandem hot strip steel mill. In the present case, a roll force gauge control system is employed at each of the seven stands S1—S7.

Conventional motorized sideguards 36 are located at predetermined points along the mill length. The sideguards 36 are operated during mill setup on the basis of the widths of the upcoming workpiece 14 thereby defining the sides of the workpiece travel path for guidance purposes.

The process control system 12 provides automatic control for the operation of the tandem mill 10 as well as preceding production processes (not indicated) such as the operation of a roughing mill. Preferably, the process control system 12 comprises a programmed process control digital computer system 38 which is interfaced with the various mill sensors and the various mill control devices to provide control over many of the various functions involved in operating the tandem mill 10. According to user preference, the control system 12 can also include conventional manual and/or automatic analog controls for backup operation in performing preselected mill functions.

The digital computer system 38 can employ a single large capacity central processor and associated input/output equipment, but at the present state of the steel mill control art there is a general user preference for using a separate central processor for each of predetermined basic mill functions. In this manner, the functioning of each central processor and its associated equipment can be made independent of the failure of any other computer processor, and disturbance to the overall mill control is limited to the span of control assigned to the failed computer. Automatic analog control or operator manual control would typically be used in place of the failed computer to provide continuance of control in the span of control associated with the failed computer.

On the basis of these considerations, the digital computer system 38 in the present case includes (1) a large capacity supervisory or setup computer system (not specifically indicated) including a central integrated process control or setup processor with associated input/output equipment (such as that included in the computer system known as the Prodac 250 (P250) and sold by Westinghouse Electric Corporation), (2) a roughing mill computer system (not specifically indicated) including a central processor with associated input/output equipment such as the computer system known as the Prodac 50 (P50) and sold by Westinghouse Electric Corporation, (3) a large capacity finishing mill logic control or director computer (not specifically indicated) such as that in a P250 system and (4) a finishing mill online roll force gauge control computer such as a P50. The P250 large capacity processor typically uses an integral magnetic core 16,000 word (16-bit plus parity) memory with 900-nanosecond cycle time, an external magnetic core 12,000-word or more (16-bit plus parity) memory with 1.1 microsecond cycle time and a mass 375,000 work or more (16-bit plus parity) random access disc memory unit. The P50 processor typically uses an integral magnetic core 12,000-word (14-bit) memory with 4.5-microsecond cycle time.

To provide for process integration, the computers are appropriately tied together through data links or other means. More particularly, the setup computer has its input coupled to information input devices and to various mill sensors while its output is coupled to the other computers in the computer system 38. The finishing mill director computer has its input coupled to predetermined mill sensor devices as well as the setup computer output, and the director computer output is coupled to the input of the gauge control computer as well as to predetermined mill control devices.

The roughing mill computer has its input coupled to the setup computer output and to predetermined roughing mill sensors. Couplings are provided between the gauge control computer input and the setup and director computers and predetermined finishing mill sensors and between the gauge control computer output and predetermined finishing mill control devices.

Each computer processor is associated with predetermined input systems (not specifically indicated), typically including a conventional contact closure input system which scans contact or other signals representing the status of various process conditions, a conventional analog input system which scans and converts process analog signals, and operator controlled and other information input devices and systems 40 such as paper tape, teletypewriter and dial input systems. It is noted that the information input devices 40 are generally indicated by a single block in FIG. 1 although different input devices can and typically would be associated with different computers in the computer system 38. Various kinds of information are entered into the computer system 38 through the input devices 40 including, for example, desired strip delivery gauge and temperature, strip entry gauge and width (by entry detectors if desired), grade of steel being rolled, any selected plasticity tables, hardware oriented programs and control programs for the programming system, etc.

The contact closure input systems and the analog input systems interface the computer system 38 with the processes through the medium of measured or detected variables. The present invention as embodied in the process control system 12 is largely involved in the functioning of the automatic gauge control computer system, hereinafter referred to as the AGC computer. In one typical invention application, various mill signals are applied to the AGC computer input systems. These mill signals include the following:

1. A roll force signal from the load cell 34 at each stand S1—S7 proportional to stand roll separating force for use in predictive feedforward roll force gauge control.
2. 14-bit screwdown position signals generated by the respective detectors 32 at the stands S1—S7 for use in predictive feedforward roll force gauge control.
3. Screwdown motor speed signals generated by respective tachometers 29 at the stands S1—S7 for use in programmed position regulation.
4. Position signals from respective loopers 41 for use in looper tension control.
5. Stand speed signals generated by respective tachometers 41, with the S6 speed signal and/or other stand speed signal used for calculation of acceleration compensation and for calculation of time delays in monitor operation.
6. A guage deviation signal from an X-ray gauge 42 at the delivery end of the mill for programmed monitor gauge control through the predictive roll force control.
7. An entry temperature signal from a mill entry temperature detector or pyrometer 44; if references are not provided by the setup computer, the mill entry temperature for a first workpiece 14 is stored, and screwdown compensation is made for subsequent workpieces 14 if a temperature difference is detected from the stored value.
8. Width signals supplied by sideguard follow potentiometers for mill spring constant calculations, etc.

It is noted at this point in the description, that the measured head end roll force is stored and used as a reference for roll force gauge control functioning at the respective stands if the AGC computer is in the lock-on mode of roll force operation. On the other hand, if the AGC computer is in the absolute mode of roll force operation, the setup computer calculates a predicted head end roll force which is used as an absolute reference for roll force gauge control functioning.

Signals from an operator station control panel 43 and miscellaneous process status and interrupt signals coupled to the AGC computer through the contact closure input system include the following:

AGC On Roll Force—for online gauge control.
AGC On Monitor—for online gauge control including steady state gauge error correction.
X-Ray Light—enables monitor operation at small loop gain.
X-Ray Heavy—enables monitor operation at large loop gain.
X-Ray Gauge 1 On—enables monitor operation with gauge 1.
X-Ray Gauge 2 On—enables monitor operation with backup gauge 2.
Light Tail Comp—enables light anticipatory compensation for reduced tension at strip tail end.
Heavy Tail Comp—enables heavy anticipatory compensation for reduced tension at strip tail end.
Light Temp Comp—enables light anticipatory compensation for temperature rundown in accordance with bar entry temperature.
Heavy Temp Comp—same as next preceding, but with heavy anticipatory compensation.
Slow Accel Comp—enables slow or light anticipatory compensation for acceleration.
Fast Accel Comp—enables fast or heavy anticipatory compensation for acceleration.
Hold X-Ray—to lock gauge control system onto current delivery gauge value and ignore desired delivery gauge for remainder of current strip.
AGC On Lock—$S(n)$—puts roll force control in the lockon reference mode of operation on a stand by stand basis.
AGC On Computer—$S(n)$—puts roll force control in absolute reference mode of operation on a stand by stand basis and sets up the computer system for use of a predicted roll force reference supplied by the setup computer.
Mill On Computer—on selection, this signal enables the setup computer to be tied into the mill control.
SD On Auto—$S(n)$—required for functioning of roll force gauge control on stand by stand basis independent of operator selection signal AGC on Roll Force.
Strip In Stand—$S(n)$—based on load cell outputs, these signals enable the roll force gauge controls to function.
Reset Screws—$S(n)$—enables the gauge control computer to reset the screwdowns to the preset value plus head end memory plus any manual change at the various stands as the Strip In Stand signals go to zero after passage of the strip tail end—the Reset signals are zero if the operator selects manual preset or if the setup computer is making the mill setup.
Accel Mill—denotes mill is under director computer or manually controlled acceleration and enables acceleration compensation to be made as selected.
Input/Output Equipment Interrupts
ASR Set (Teletypewriter) Interrupts
Strip Anticipate Interrupt—a hot metal detector generates this signal to initiate the AGC program for a pyrometer temperature reading prior to strip entrance to S1.
Calibrate SD Interrupt—$S(n)$—for converting the relative reading of the screwdown position detector into an absolute screwdown position which is used in the AGC computer for estimation of the mill spring constant and for initial screwdown calibration.

The above station, status and interrupt signal list is not exhaustive and is presented only to illustrate the kind of details involved in applications of the invention. Some of the signals indicated above will be better understood with reference to subsequent portions of the present description.

A contact closure output system would normally be associated with each of preselected computers in the digital computer system 38. In this instance, contact closure output systems are respectively associated with the director computer, the roughing mill computer and the AGC computer. In the operation of the AGC contact closure output system, various control devices are operated in response to control actions calculated or determined by execution of control programs in the AGC computer.

To effect determined control actions, controlled devices are operated directly by means of output system contact closures or by means of analog signals derived from output system contact closure through a digital to analog converter. The principal control action outputs from the AGC computer contact closure output system include screwdown positioning commands, which are applied to respective screwdown positioning controls 48 in operating the screwdown motors 28 for screw movement, and speed anticipate signals which are applied in the various looper tension control systems to cause a change in drive speed to compensate the force on the strip for a change in thickness being made by screwdown movement.

Display and printout systems 46 such as numeral display, tape punch, and teletypewriter systems are also associated with the outputs of the digital computer system 38 in order to keep the mill operator generally informed about the mill operation and in order to signal the operator regarding an event or alarm condition which may require some action on his part. The printout systems are also used to log mill data according to computer log program direction.

An external interrupt unit (not specifically indicated) would also be associated with each computer processor. It signals the associated processor when an input is ready for entry or when an output transfer has been completed. The central processor generally acts on interrupts in accordance with a conventional executive program which is a part of a programming system for that processor and controls the use of central processor circuitry for periodic or other execution of the control and other programs. In some cases, particular interrupts are acknowledged and operated upon without priority limitations.

It is noteworthy that the interfacings shown in the drawing between the digital computer system 38 and the process are representative of the couplings between the director computer with the mill 10 as well as those between the AGC computer and the mill 10. For example, the initial screwdown position setups at the stands S1—S7 can be effected by the director computer through the AGC computer and its output and through the screwdown positioning controls 48. As another example, the initial speed setups at the stands S1—S7 are effected by the director computer through its own contact closure output system and through speed and tension controls 50 which operate the respective stand drives 26. The setup of the sideguards 36 are similarly controlled by the director computer. As a final illustration, the mill speed profile, i.e. mill acceleration or deceleration and constant mill speed conditions over the operating period of the mill, are also controlled by the director computer through control actions applied directly to the stand drive controls 50.

It is generally further noted that the related parts of the roughing mill and setup computer operations would typically provide for setup and sequencing of roughing mill rolling of known slabs into specified bars as well as control of material handling and other functions connected with entering slabs into the roughing mill and transporting bars for entry into the hot strip finishing mill 10. The setup computer would typically calculate the roughing mill drafting schedule which is used by the roughing mill computer to set up the roughing mill.

The setup computer calculates the mill speed profile and the drafting schedule, the screwdown position, stand speed and strip tension setup valves for each finishing mill stand S1—S7. The director computer effects startup and sequencing of the finishing mill drives 26 and other mill equipment as required for the initiation of the rolling operation. The model equations used in the finishing mill setup program would typically provide for updating in order to provide better setups and improved head end gauge results on the basis of the results achieved with the setups for previous workpiece rolling operations. Other finishing mill functions such as mill entry scale breaker operations, spray operation and roll changing would also be controlled by the director computer.

Since the present invention pertains to online gauge control in the finishing mill 10, more detailed control and computer system description will be so limited. Computer system description will thus be mainly directed to the AGC computer since it functions substantially separately to provide online gauge control.

Generally, the AGC computer uses Hooke's law to predict the total amount of screwdown movement required at each roll force controlled stand at the calculating point in time for roll force error correction, i.e. for loaded roll opening and stand delivery guage correction to the desired value. The predictive calculation defines the total change in the unloaded roll opening required to offset a new mill stretch value or other roll force and guage error causing condition. The predictive corrective screwdown position change value is employed in a screwdown position control program in the AGC computer to define the screwdown motor position-time profile to be followed in making the corrective screwdown movement.

Since the total screwdown movement is defined, screwdown correction can be made with or nearly with an optimal or critical damping screwdown position-time profile depending on the accuracy with which the defined corrective screwdown movement is predicted. On this foundation, the previously indicated Eggers and Csonka control provided more consistent critical stand gain tuning, improved gauge control speed, accuracy and stability at each roll force gauge controlled stand, and improved uniformity of mill delivery gauge and improved mill productivity. The present invention provides further improvement on this foundation.

Speedier stand gauge control operation generally results in reduced need for transport delayed screwdown offset or monitor correction for temperature rundown and other ramplike conditions which might otherwise require screwdown offset. Such conditions tend to cause a persistent "transient" gauge error, or in effect a steady state gauge error, unless counter control action is taken, and controls prior to the Eggers and Csonka control had been somewhat inadequate in this respect as already indicated. Eggers and Csonka provided substantial improvement over the prior art and the present invention provides further improvements in reduction of transport delayed screwdown offset as a result of improved stand gain tuning and faster more accurate roll force gauge control.

The overall online gauge control system includes the roll force gauge controls of the individual stands and a screwdown offset control system. In turn, the screwdown offset control system preferably includes an X-ray monitor gauge control loop operated in response to the X-ray gauge 42.

At the startup of rolling mill operation, the setup computer generates respective screwdown preset outputs which are coupled as previously indicated to the screwdown positioning controls 48. The screwdown motors 28 are thereby controlled to drive the screwdowns 30 and produce the respective desired unloaded roll openings at the stands S1—S7. At the same time, the setup computer generates stand speed and interstand tension setups which are coupled as previously indicated to the speed and tension controls 50. In accordance with conventional practice, the setup values are based on bar entry data (such as bar width, thickness and temperature) data on desired strip delivery characteristics, programmed drafting rules, updating information from previous workpiece setup results, etc.

The director computer effects the setup conditions and also sequences all devices associated with initiating the rolling operation and threading the strip through the successive stands and onto the downcoiler. After the mill has been operated through the program determined mill speed profile such that the mill has been accelerated and thereafter decelerated to provide strip delivery and coiling on the downcoiler 16, new setup conditions are computed for the upcoming entry bar and the screwdowns 30 are reset, etc., i.e. the process is restarted.

Mill acceleration is useful for increasing productivity and for controlling finishing strip temperatures and product quality all as more fully described in the aforementioned copending Cook application. It is noteworthy relative to gain tuning considerations that hot mill acceleration causes reduced strip temperature loss because of reduced heat transfer during the shortened rolling time, and as a consequence smaller strip plasticity changes are experienced particularly at later stands of the accelerated hot tandem mill.

During rolling operation, the online gauge control system operates the stands S1—S7 to produce strip product having desired gauge and proper shape, i.e. flat with slight crown. Online gauge control is provided by the roll force gauge control loops at the stands S1—S7 and the previously noted screwdown offset gauge control system and its monitor gauge control system.

In the monitor system, the X-ray gauge 42 produces the previously indicated X-ray deviation signal which indicates the difference between actual strip delivery thickness and desired strip delivery thickness. In other cases, it may be desirable to employ an absolute thickness X-ray gauge signal to form a basis for monitor control actions or, more generally, for screwdown offset control actions.

To effect online gauge control in the closed loops, the programmed AGC computer system operates on the screwdown position detector and load cell signals from each stand as well as the X-ray gauge deviation signal to determine the control actions required for producing desired strip delivery guage. Screwdown motor speed is in this instance also applied to the computer system 38 in order to provide for programmed screwdown positioning control. In effecting control operations, the AGC computer employs an AGC programming system which forms a part of the total programming system for the computer system 38. The AGC programming system includes programs oriented to controlling the AGC computer system hardware and programs oriented to developing the control actions.

Figure 2:
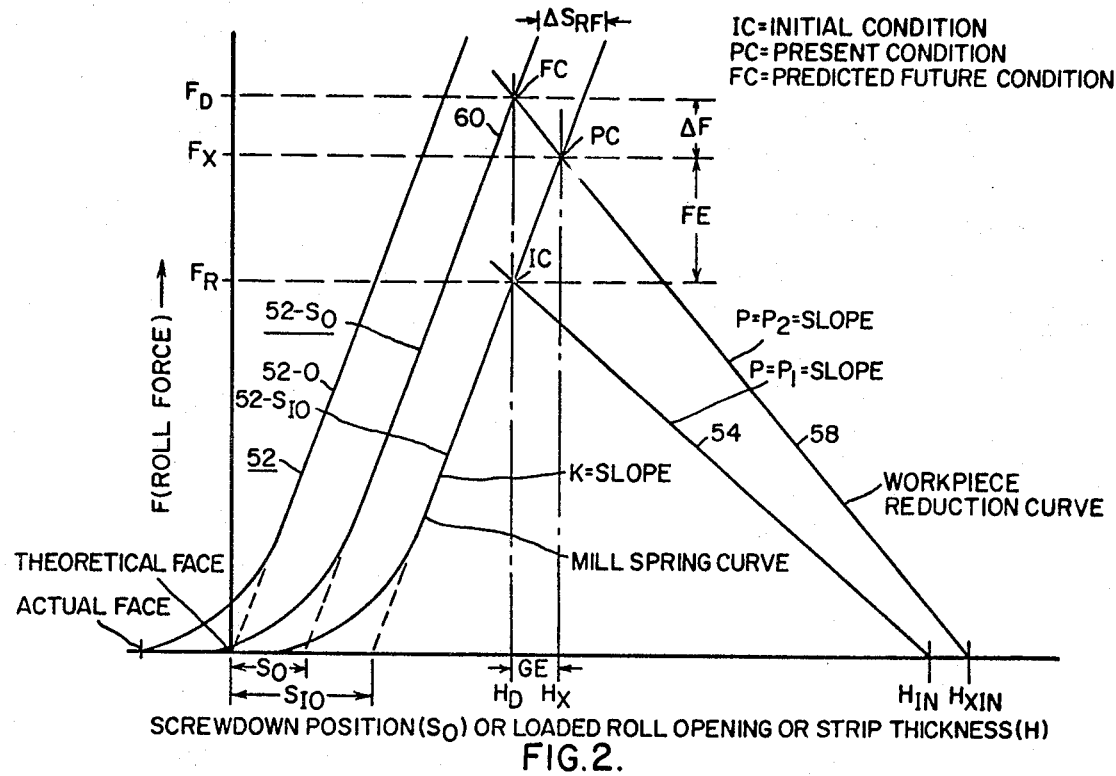
FIG. 2 illustrates a mill spring curve and a workpiece reduction curve and the manner in which roll force screwdown correction is determined from these curves.

In FIG. 2, curves are shown to illustrate the application of Hooke's law to a rolling mill stand and to illustrate the unique basis upon which the process control system 12 and in particular the online AGC computer gauge control system provides improved gauge control speed, accuracy and stability and other operating benefits. First, there is shown a mill spring curve 52 which defines the separation between a pair of mill stand work rolls as a function of separating force and as a function of screwdown position. The slope of the mill spring curve 52 is the mill spring constant $K$ which is subject to variations as previously described. When a correct screwdown calibration is known and the screwdowns are positioned such that the empty work rolls are just facing, the unloaded screwdown zero position is defined. The zero screwdown spring curve location is indicated by the reference character 52–0.

At the correct calibration condition, the indicated theoretical face intersect represents theoretical roll facing and it is for this theoretical condition that the screwdown position is assigned a zero value. Under the correct calibration condition, roll facing actually occurs when the screwdown position is at a slightly negative value because of the nonlinearity of the lower part of the mill spring curve. A definition of the screwdown calibration as being correct for the indicated theoretical condition is, however, convenient and appropriate for mill operation.

When the screwdowns are opened (positive movement) the unloaded roll opening increases as reflected by a change in the graphical location of the mill spring curve as indicated generally at 52–$S_0$ such that the theoretical spring curve intersect equals the new unloaded roll opening. With screwdown closing, the mill spring curve is shifted to the left in a similar manner.

At any particular screwdown position and with correct screwdown calibration, the stand workpiece delivery gauge equals the unloaded roll opening as defined by the screwdown position $S_O$ plus the mill stretch caused by the workpiece. If the screwdown calibration is incorrect, i.e. if the number assigned to the theoretical roll facing screwdown position is something other than zero because of roll crown wear or other causes, the stand workpiece delivery gauge equals the unloaded roll opening plus the mill stretch plus or minus the calibration drift.

The amount of mill stretch depends on the characteristic reduction curve for the workpiece. As shown in FIG. 2, a reduction curve 54 for a strip of predetermined width represents the amount of force required to reduce the workpiece from a stand entry thickness (height) of $H_{IN}$. The workpiece plasticity $P$ is the slope of the curve 54, and in this case the curve 54 is shown as being linear although a small amount of nonlinearity would normally exist.

Desired workpiece gauge $H_D$ is the initial condition IC produced in this case since the amount of force required to reduce the workpiece from $H_{IN}$ to $H_D$ is equal to the amount of roll separating force required to stretch the rolls to a loaded roll opening $H_D$, i.e. the intersection of the mill spring curve at an initial screwdown opening $S_{IO}$ indicated by mill spring curve locations 52–$S_{IO}$ and the workpiece reduction curve 54 lies at the desired gauge value.

If the stand delivery gauge increases by an error amount $GE$ to $H_X$ during a workpiece pass to produce a present condition PC, in this instance because the workpiece plasticity increases and because the workpiece entry thickness increases to $H_{XIN}$ as represented by the reduction curve 58, the stand screwdowns must be closed to a value which causes a future correct gauge condition FC. At the condition FC, the intersection of the mill spring curve and the new reduction curve 58 lies at the desired gauge $H_D$ as provided by a spring curve location indicated by the reference character 60 and previously generally referred to by the general reference character 52–$S_O$. In other words, corrective screwdown closing causes the unloaded screw opening to be reduced by an amount $\Delta S_{RF}$ to a new value which adds with the new mill stretch to equal the desired gauge $H_D$.

As set forth in the aforementioned Eggers and Csonka application, $\Delta S_{RF}$ is predictively calculated to produce feedforward roll force gauge control operation as opposed to conventional feedback roll force gauge control operation. The feedforward operation is based on the following programmed algorithm:

Equation (3)

$$\Delta S_{RF} = \left[\frac{P}{K^2} + \frac{1}{K}\right] \cdot FE = L \cdot FE = \text{required screwdown correction}$$

where:

$$L = \frac{P}{K^2} + \frac{1}{K}$$

$$K = \text{mill spring constant} \left(10^6 \frac{LB}{IN}\right)$$

$$P = \text{workpiece plasticity} \left(10^6 \frac{LB}{IN}\right)$$

Equation (3) is derived with reference to Fig. 2 as follows:

Equation (4) $\quad GE = \frac{FE}{K} = \text{gauge error}$

Equation (5) $\Delta F = P \cdot GE = $ expected change in roll force resulting from corrective screwdown movement Equation (6)

$$\Delta S_{RF} = \frac{\Delta F}{K} + \frac{\Delta F}{P} = \Delta F \cdot \left[\frac{1}{K} + \frac{1}{P}\right]$$

Equation (7)

$$\Delta S_{RF} = P \cdot GE \cdot \left[\frac{1}{K} + \frac{1}{P}\right] = \frac{P}{K} \cdot FE \cdot \left[\frac{1}{K} + \frac{1}{P}\right]$$

$$= \left[\frac{P}{K^2} + \frac{1}{P}\right] \cdot FE$$

In order to calculate the predicted amount of screwdown movement required to correct a roll force error; the force error $FE$ is calculated as follows:

Equation (8) $FE = F_X - F_R - K(S_O - S_{IO})$

In providing for the roll force error calculations, Equation (8) defines the difference between the present roll force $F_X$ and the reference roll force $F_R$ (either lockon or absolute as predetermined) and subtracts from that difference the amount of change in roll force caused by screwdown movement made to correct previous roll force error. Thus, the roll force error as calculated at any point in time with the use of Equation (8) properly equals the amount by which the present measured roll force differs from the roll force required for correct gauge at the present screwdown position. For the condition PC shown in FIG. 2, $S_O S_{IO}$ in Equation (8), but in general $S_0$ would typically have some value other than $S_{IO}$.

Corrective screwdown movement in the predicted amount produces further roll force change and $FE$ becomes zero if the system behavior corresponds to predictions and if no new roll force error develops during the period of correction. If the system does not behave as predicted, $FE$ does not become zero and in effect a new roll force error $FE$ is generated to the extent that the executed screwdown movement in the predicted amount fails to correct the stand delivery gauge.

It is also noted at this point in the description that the screwdown reference $S_{IO}$ used as a base for determining the force error $FE$ in Equation (8) is updated as follows:

Equation (9) $S_{IO}$ (new) $= S_{IO} - S_M + S_{CEL} - S_{RFP}$ where:
- $S_M =$ screwdown offset produced by X-ray monitor operation
- $S_{CEL} =$ screwdown offset produced for anticipatory gauge correction during mill acceleration or deceleration
- $S_{RFP} =$ screwdown offset produced for roll force error anticipated by feedforward action.

These quantities will be considered more fully subsequently. By way of explanation, the screwdown references $S_{IO}$ is updated in accordance with Equation (9) as changes occur in $S_M$ and $S_{CEL}$ and $S_{RFP}$ in order to prevent the stand roll force gauge control system form responding to roll force changes caused solely by screwdown movement required by external screwdown offset system control for screwdown calibration, head end gauge error correction in the lockon mode of operation, anticipatory mill speed change compensation, anticipatory roll force error compensation or other gauge error correcting purposes. If monitor, acceleration or roll force profile gauge correction is not employed in the system 12, the corresponding term $S_M$ or $S_{CEL}$ or $S_{RFP}$ is omitted from Equation (9).

In predicting and effecting the total amount of screwdown movement required to correct roll force errors in accordance with Equation (3), the process control system 12 is properly "electrically"calibrated similar to the manner previously defined and it is characterized with a controlled system gain which enables the screwdowns to be operated with critical or near critical damping more consistently than was heretofore possible under dynamic mill operating conditions. In particular, the AGC computer has the capability of defining substantially critical damping screwdown operation as a function of the amount of corrective screwdown movement predictively required on the basis of automatically determined workpiece plasticity at any particular stand and at any preselected point in time.

One possible limiting factor on reaching critical damping screwdown movement and 100 percent gain tuning on more or less continuous basis is the accuracy with which the corrective screwdown movement calculations correspond to actual screwdown movements required for correction of gauge errors. In turn, the accuracy of screwdown movement prediction depends on the accuracy of predicting the operative values of $K$ and $P$. The present invention provides improvement over both the Eggers and Csonka disclosure and the previous Smith disclosure in the means and manner by which the quantities $P$ and $L$ are determined in Equation (3) and thereby the accuracy and/or convenience with which corrective screwdown movement is predicted.

Generally the operative value of each stand spring constant $K$ is relatively accurately known. It is first determined by the conventional work roll screwdown test, and it is recalculated prior to each workpiece pass on the basis of the workpiece width and the backup roll diameter. Each resultant spring curve 52 is stored for online gauge control use.

The form in which the spring constant $K$ is stored can vary. In the present case, the slope of the linear part of the spring curve is stored as a single value. The nonlinear part of the spring curve in this case is estimated by three straight lines of increasing slope with the respective slopes stored as three separate spring constant values which are respectively used when the mill stand is operated in the corresponding force range. As future mill data returns from computer data logging demonstrate presently unknown relationships which may define online variations of the mill spring constant as a function of certain mill variables, provision can be made for programming online calculations of the mill spring constant in accordance with such relationships under dynamic mill operating conditions.

In accordance with the present invention, the operative value of the workpiece plasticity $P$ at each stand is automatically determined with improved accuracy and/or convenience by means of calculations based on process measurements. Specifically, such measurements include those quantities which make it possible to calculate stand delivery gauge and as required stand entry gauge. Accordingly, the measurements can for example be in the form of readings from the X-ray gauge 42 and stand speed values which enable mass flow calculations to be made in instantaneously determining the actual stand delivery gauge at each stand of the tandem mill. The mass flow gauge determination technique would normally be employed only if setup computer capacity is available, and if it is used some other approach must be used for determining the workpiece plasticity during threading and prior to X-ray feedback. The initial plasticity determination could be made by programmed selection from $P$ tables as described in the Eggers and Csonka application but limited in scope to the purpose here involved. If good screwdown calibration is maintained in a tandem mill and in any case in a reversing mill, initial plasticity determination can also be made from an automatic roll force technique of gauge determination.

In the present case, adequate screwdown calibration or its equivalent is maintained by screwdown offset control and the automatic roll force gauge determination technique is the preferred means of workpiece plasticity determination during tandem mill threading as well as during run rolling. For a further improved approach to plasticity determination based on automatic process measurements, reference is made to the aforementioned Smith application entitled "Predictive Gauge Control Method and Apparatus With Adaptive Plasticity Determination For Metal Rolling Mills."

For a fuller understanding of the automatic roll force gauge determination technique, further consideration of FIG. 2 is required. The workpiece plasticity is determined at each tandem mill stand by the following general relationship:

Equation (10)
$$P = \frac{F}{H_e - H_d}$$

where:
- $F =$ roll force
- $H_e =$ workpiece stand entry thickness
- $H_d =$ workpiece stand delivery thickness.

For example, in the specific case where the stand entry gauge is $H_{XIN}$, the plasticity $P_2$ is calculated as follows:

$$P_2 = \frac{F_D}{H_{XIN} - H_D}$$

In the first stand of a tandem mill or in a single stand reversing mill, the entry gauge $H_e$ in Equation (10) is normally determined from stored information or it may be determined from an X-ray gauge or the like. For subsequent tandem mill stands, the entry gauge $H_e$ is preferably determined as follows:

Equation (11)
$$H_e(N) = S_o(N-1) + \frac{F(N-1)}{K(N-1)}$$

where:
- $S_o$N1) = transport delayed screwdown position at stand ($N-1$ which precedes stand $N$ for which the entry gauge is being determined
- $K(N-1) =$ spring constant (transport delayed if necessary) for the stand ($N-1$)
- $F(N-1) =$ transport delayed roll force at the stand ($N-1$).

In Equation (11), transport delayed values of $S_o(N-1)$ and $F(N-1)$ are used in order to make a calculation of $H_e$ at stand $N$ which reflects screwdown and roll force values at stand ($N-1$) at the point in time when the workpiece portion entering stand $N$ had been in stand ($N-1$). The spring constant $K(N-1)$ is transport delayed only if it is undergoing computer determined variation. Appropriate computer programming and storage provides for the described transport delays in the calculations. Similar calculating use is made of transport delay if the mass flow technique of gauge calculation is used.

To determine the stand delivery gauge $H_d$ at any tandem or reversing mill stand, the following relationship is preferably used:

Equation (12)

$$H_d(N) = S_o(N) + \frac{F(N)}{K(N)}$$

where:

$S_o(N)$ = screwdown position at the stand $N$
$K(N)$ = spring constant for the stand $N$
$F(N)$ = roll force at the stand $N$.

No transport delay is required in making the delivery gauge calculations.

As previously indicated, stand entry and delivery gauges can also be determined by mass flow calculations. If the screwdowns are not kept well calibrated, such as in the manner described in the aforementioned Smith application entitled "screwdown Offset System and Method For Improved Gauge Control," it could well be desirable to empty the mass flow gauge determination technique in making plasticity determinations. As another example, it may well be desirable to employ the mass flow gauge technique for workpiece plasticity determination where stand gauge control is based on stand elongation of the workpiece or other sensed data other than roll force. In that event, ascertained workpiece plasticity values would not be used in roll force gauge control but rather in predictive screwdown positioning control directed to moving the mill spring and workpiece reduction curve intersection point so as to achieve desired gauge changes which are indicated to be required by the particular type of stand gauge control system employed or by the screwdown offset monitor gauge control system. On the other hand, the roll force technique of plasticity determination can be used even though roll force stand gauge control is not used, and in that event roll force determined plasticity values could at the least be used in making screwdown position changes which would predictively cause the stand gauge to change by amounts specified by the screwdown offset or monitor gauge control system.

It is noteworthy that the roll force plasticity determining technique associated with Equations (11) and (12) is especially useful in single stand reversing mills even if the reversing mill screwdowns are miscalibrated because calibration error cancels out when Equations (11) and (12) are applied to the reversing operation. Thus, the delivery gauge for pass ($N-1$) is:

$$H_d(N-1) = S_o(N-1) + \frac{F(N-1)}{K} + S \text{ (error)}$$

where: $S$ (error) = calibration drift.

The delivery gauge for pass (N) is:

$$H_d(N) = S_o(N) + \frac{F(N)}{K} + S \text{ (error)}$$

Since $H_d(N-1) = H_e(N)$, it follows that:

$$P = \frac{S_o(N-1) + \frac{F(N-1)}{K} - S_o(N) - \frac{F(N)}{K}}{F(N)}$$

It is thus clear that calibration error cancels out of Equations (10), (11) and (12) for single stand reversing mills.

In tandem mills, the fact that calibration errors would normally be different at the different stands would prevent cancellation of error, and this explains the preference for maintaining good tandem mill screwdown calibration if the roll force technique of gauge calculation is used for using the mass flow technique of gauge calculation if the tandem mill screwdowns are allowed to become miscalibrated. As previously indicated, the use of one particular technique as opposed to another also depends on other factors such as the amount of computer capacity required and the amount of computer capacity available.

It is also noteworthy that in predictively determining corrective screwdown movement the specifically described Eggers and Csonka approach includes the predictive calculations of screwdown position change as defined by Equation (3). As subsequently explained more fully, net screwdown position is calculated by subtracting or adding calculated corrective changes. If desired, the Equation (3) procedure can be replaced by an equivalent formulation of net screwdown position determined from basic trigonometric relations and represented more directly in terms of stand entry and delivery gauges as follows:

Equation (13)

$$S_o(N)' = H_D(N) - \frac{H_e(N) - H_D(N)}{H_e(N) - H_d(N)} \cdot [H_d(N) - S_o(N)]$$

where:

$S_o(N)'$ = predicted correct screwdown position
$S_o(N)$ = present screwdown position.

In applying Equation (13) to FIG. 2, assume that the workpiece entry thickness is $H_{XIN}$ and the screwdowns are at the position $S_{I0}$ which produces the gauge $H_X$ as indicated by PC. The correct gauge $H_D$ is produced at the condition FC and it is given by:

$$S_O = H_D - \frac{H_{XIN} - H_D}{H_{XIN} - H_X} \cdot [H_X - S_{IO}]$$

Note that if the present gauge $H_X$ were equal to the desired gauge $H_D$ the correct screwdown position would be predictively calculated to be the present screwdown position $S_{IO}$.

To provide coordinated mill delivery gauge control, the computer process control system 12 provides steady state gauge correction by means of the previously described screwdown offset system in this case preferably including the X-ray steady state gauge correcting monitor system as well as an anticipatory acceleration or deceleration correction system and an anticipatory roll force error correction system. To tie these gauge correcting systems into the stand roll force gauge control systems, the following formula is used:

Equation (14) $\Delta S = \Delta S_{RF} - S_M + S_{CEL} + S_{RFP}$

If monitor, acceleration or roll force profile gauge correction is not employed in the system 12, the corresponding term $S_M$ or $S_{CEL}$ or $S_{RFP}$ is omitted from Equation (14).

Monitor correction is selectively made at each stand for X-ray gauge error, which may result from screwdown miscalibration, head end error in the lockon mode if applicable, and other causes, and each correction depends in this instance on whether the delivery error is at or above some minimum value characteristic to that stand and further on a preestablished control relationship characteristic to that stand. For a roll force gauge control system in which monitor functioning for transport delayed screwdown recalibration is eliminated and replaced by nearly instantaneous recalibration action as individually required at any miscalibrated stand, reference is made to the aforementioned Smith application entitled "Screwdown Offset System And Method For Improved Gauge Control." When the subject matter of that application is employed with the present disclosures, the recalibration offset factor OS referred to therein can be reflected in on line roll force gauge control by algebraic addition with the right side of Equation (8) or by algebraic addition with the right side of Equation (14). In the latter case, the monitor term $S_M$ would normally be retained, i.e. a monitor system would be used with the recalibration system, but in some cases monitor action and the terms $S_M$ can possibly be omitted particularly if the absolute mode of roll force reference operation is used.

The acceleration or deceleration correction made at each stand is in this instance related in fixed program relationship to the amount of mill acceleration and deceleration scheduled by the director computer mill speed profile program for strip delivery program for strip delivery temperature or productivity control. The timing of the correction in relation to the timing of mill speed changes is appropriately programmed. With anticipatory acceleration and deceleration correction, monitor system operation is reduced.

Anticipatory roll force error correction is provided at predetermined stands on the basis of the measured roll force history at one or more preceding stands. The correction made at any stand provided with the roll force profile feedforward feature is determined by AGC programming based on calculated transport delays and on the magnitude of the force error(s) in the feedforward profile(s). The main advantage of the anticipatory roll force error correcting system is that screwdowns at a subsequent stand can be started moving to meet an upcoming roll force error which is expected as a result of previous stand experience. Thus, faster roll force gauge control response is produced and better gauge control capability results especially with respect to skid marks and the like since conventional growback is reduced or eliminated. To some extent, transport delayed screwdown offset or monitor system operation can be reduced by roll force error profile feedforward action because faster roll force gauge control response is enabled for temperature rundown and other ramplike conditions as previously described.

If it is desired to provide screwdown offset for strip elastic recovery compensation, the amount of recovery is determined as a function of metal grade, stand entry thickness, stand reduction, stand entry temperature, etc. and it is included as another factor in Equation (14) or otherwise reflected in the control calculations. Similarly, elastic recovery can be suitably reflected in plasticity calculations in Equation (10) if required. Normally, however, elastic recovery has negligible effect on strip gauge by current cold and hot mill gauge control performance standards.

In the AGC programming system, the hardware oriented programs include conventional analog scan and contact input status scan programs and a priority executive program. The analog scan rate can for example be 30 points per second and the complete scan of input contacts can for example be made about every 0.2 seconds.

The priority executive in the present case has two levels of operation, the dominant level and the secondary level but only the secondary level is employed. Each of these two levels can have a number of sublevels. In addition, as already noted, some interrupt routines run outside the priority structure.

The secondary level is provided with 15 sublevels, and each of the sublevels can be in any of five states:
1. Bidding
2. Running
3. Time delay
4. Suspended
5. Turned off When a program is running on a secondary sublevel, it cannot be interrupted by another secondary sublevel program, although it can be interrupted by an interrupt routine or by the dominant level (not used in this case). When a sublevel program goes into a time delay or suspension or turnoff, the priority executive searches for the highest priority sublevel which is bidding and places it in the running state. In one application of the invention, the following secondary sublevel control oriented programs were defined for the AGC programming system:

15. Screwdown Positioning Control Program
14. Screwdown Positioning Start-Stop
13. Input-Output Decode—for translation to and from machine language.
12. AGC Control Program
11. Periodic Level—various programs directed to miscellaneous housekeeping functions.
10. Display and Zero Error—for operator displays and indications.
9. (Not Used)
8. AGC Entry Panel Program—for engineering and maintenance adjustments to the system.
7. Programmers Console—for programmer entry or changes to data and programs.
6. AGC Initialization—run at the start at each strip to set buffers and flags and calculate $K$ and other parameters which are a function of strip width and other entry characteristics.
5. (Not Used)
4. Screwdown Position Detector Calibration
3. Ex Post Facto Log—for diagnostic printout.
2. Screwdown Slowdown Profile Determination
1. Diagnostic and Alarm Messages.

The AGC program includes an anticipatory roll force error profile subprogram, a screwdown offset subprogram and an anticipatory mill acceleration-deceleration subprogram. The screwdown positioning control program functions in response to a screwdown position setpoint called for by the AGC program.

Generally, the screwdown offset subprogram in this case is nominally executed about every 0.2 seconds after every X-ray gauge reading. It performs functions including the following:
1. Check selector switches and permissives.
2. Check X-ray deviation against limits.
3. Calculate monitor control action $S_M$ for each monitor controlled stand.
4. Maintain time delays between successive corrections on each stand.
5. Update parameters if operator selector switches change.
6. Retain the head end gauge error for screwdown reset at the end of the strip if the setup computer is off line.
7. Calculate light or heavy screwdown correction $S_{CEL}$ to compensate for the effects of strip acceleration or deceleration.
8. Calculate anticipatory roll force $S_{RFP}$ at stands S2—S7 from previous stand roll force profile or profiles as preselected.
9. Calculate heavy or light tail end compensation for tail end loss of tension.

The selector and permissives checking function of the program is executed before calculating any monitor control action. Thus, screwdown offset control action is made possible in this instance only if a master AGC selector switch is turned to MONITOR and an X-ray sensitivity switch and an X-ray gauge selector switch are in a position other than OFF. Further, the gauge selected must be the same one which had been selected at the start of the strip and the X-ray gauge signal must be available and within programmed limits. Another significant permissive is that a predetermined delay time period must have expired since the strip was first detected under the X-ray gauge 42.

The X-ray deviation signal is first converted to engineering units before it is checked against limits. Typically, a plus or minus 5-volt signal would correspond to a digital number range of plus or minus 4,096 and a gauge range of plus or minus 10 mils. A plus sign would correspond to heavy gauge while a minus sign would correspond to light gauge. The absolute magnitude of the X-ray deviation signal is checked against a predetermined limit value and if the deviation is greater than that value no attempt is made at monitor correction because it is presumed that either the gauge reading is in error or an extremely bad setup has been made. In that event, a monitor hold pushbutton may be operated by the mill operator in which case the present erroneous gauge is stored as the new target value and appropriate compensation is then made in the AGC program control calculations at the new target value.

Calculation of the monitor control action $S_M$ at the various stands is provided on the basis of two-mode control, i.e. the correction is the sum of proportional and reset terms.

Equation (15) $S_M(I) = M_1(I) \cdot (XD) + M_2(I) \cdot \int (XD) \cdot dt$ where:

$M_1(I)$ = proportionality constant as preselected for stand S1, ... S7

$M_2(I)$ = integration constant as preselected for stand S1, ... or S7

$XD$ = X-ray gauge deviation.

The integral quantity is checked against preset limits to prevent the integral from winding up during periods of sustained error and to allow rapid recovery when the error changes sign. The calculated result $S_M$ for each stand is also checked against preset limits and stored for use in the AGC program.

A deadband is set for each stand in the monitor control action calculations. The deadband feature results in monitor system corrections for small delivery gauge errors in the last two or three mill stands. Larger delivery gauge errors cause control action to be extended backwardly in the mill toward earlier stands.

In order to maintain system stability, successive control actions at a particular stand must be spaced in time by an amount greater than the transport delay for the strip to travel from the stand to the X-ray gauge 42. The control calculations for monitor action preferably employ a distinct sampling rate for each stand to correspond to monitor control actions at that stand with the particular transport delay associated with it. In addition, the sampling rate for each stand is preferably also made adjustable by the initialization program, within the limits of stability.

In making the monitor control calculations, the screwdown offset program preferably also provides for phase shifting the sampling system operative for each stand. Thus, the timing between successive X-ray gauge reading samples which are to be used for successive control calculations at a particular stand can be adjusted in dependence upon the error deadband. For example, the X-ray deviation signal is sampled every 0.2 seconds and a particular stand may have its sampling system set for a sampling rate of 1.0 seconds. Every fifth X-ray deviation reading would thus be used for control calculations at that stand, but if the delivery gauge error is within the error deadband, i.e. no control action is necessary, the stand sampling rate is increased to a higher value such as the rate at which the X-ray deviation readings are being taken, i.e. one every 0.2 seconds. In this manner, corrective control actions can be developed more quickly following the development of a gauge error outside the error deadband. Following reinitiation of monitor control action, the stand sampling system is returned to its stable sampling rate.

To make the acceleration or deceleration correction calculation, the screwdown offset subprogram can for example, determine the difference between the current speed of S6 and the thread speed of S6 and during mill acceleration make an accumulating screwdown opening correction equal to a predetermined constant times the difference and during mill deceleration make an accumulating screwdown closing correction equal to a predetermined constant times the difference. Anticipatory roll force corrections based on a previous stand roll force profile take into consideration the transport delay as previously indicated. The anticipatory roll force profile screwdown movement $S_{RFP}$ is calculated as follows:

Equation (16) $S_{RFP} = C(I) \cdot (FE)_p$ where:

$(FE)_p$ = feedforward roll force error $C(I)$ = preselected constant for each stand $I$ which provides weighted response to $(FE)_p$ from the particular forwarding stand; weighing is based in part on the typical or if desired actual on line stand $I$ value of $L$ in Equation (3).

Screwdown offset subprogram calculations for tail end compensation are made straightforwardly in accordance with preselected heavy or light compensation values.

Generally, the AGC program runs periodically for each stand in the mill 10, and it calculates the respective screwdown movements required to maintain interstand gauges which lead to a finished strip product having improved uniformity and accuracy of gauge at the desired value. Roll force readings from the load cells 34 are entered into the AGC computer and stand delivery gauge changes are inferred from roll force changes generally through the application of Hooke's Law and specifically by use of Equation (8). The screwdown position change required to correct a roll force error is predictively calculated in accordance with Equations (7) and (10), and the total screwdown position change as calculated by use of Equation (14) includes the screwdown position change required for roll force error correction and any screwdown position change required for screwdown offset.

Execution of the AGC program provides the following basic functions:

1. Check strip in stand logic for stand under control and adjacent stands.
2. Check operator selections and permissives.
3. Lockon to reference value of roll force or accept absolute reference roll force from setup computer.
4. Detect changes in roll force and calculate workpiece plasticity and corrective changes in screwdown position.
5. Calculate a screwdown reference position for the stand under control by combining the previous screwdown reference with the screwdown changes calculated in step 4 for roll force error compensation and in the screwdown offset subprogram for monitor compensation and anticipatory acceleration, tail end tension and roll force profile feedforward compensation.
6. Accumulate manual movement, if any, and reset screwdown at end of the strip if the screwdown reset function is not under setup computer control.
7. Call the screwdown positioning program.

More specifically, prior to determination of the control actions, the AGC program checks a number of operator selections and plant status contacts. The more significant checks include the following:

1. Master AGC selector must not be off.
2. AGC selector for the stand under control must not be off.
3. Strip in stand signal must be received.
4. Strip in next stand plus short-time delay must be received.
5. Screwdown must be on automatic status.

If any required selection or permissive conditions is not satisfied, the roll force gauge control loop for the stand under program execution is made inoperative and roll force error and screwdown offset corrections are disabled for that stand.

Figure 3:
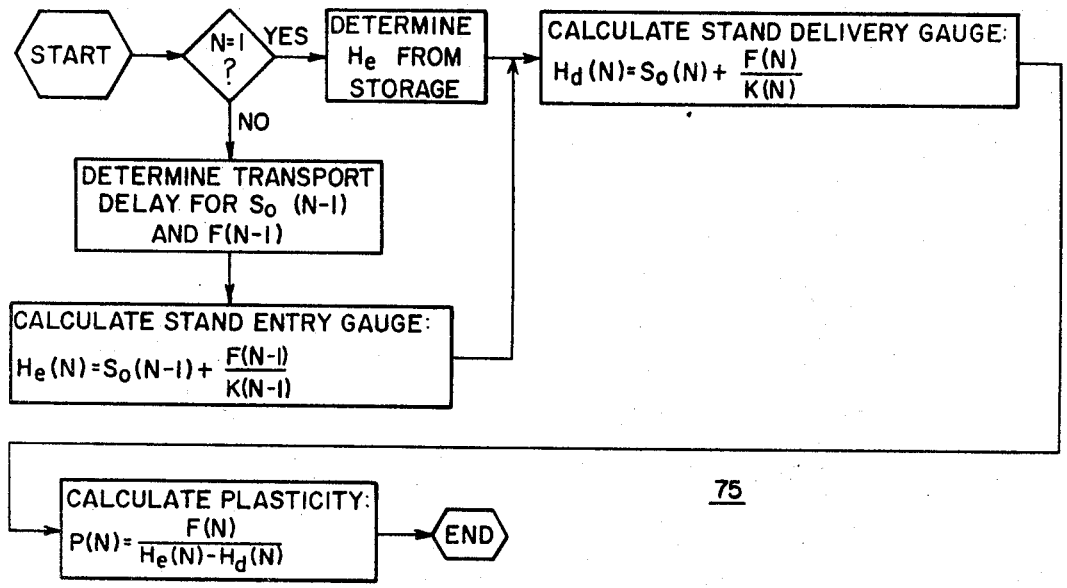
FIG. 3 shows a portion of a schematic logic flow diagram of an automatic gauge control program employed in the control computer to determine workpiece plasticity.
Figure 4:
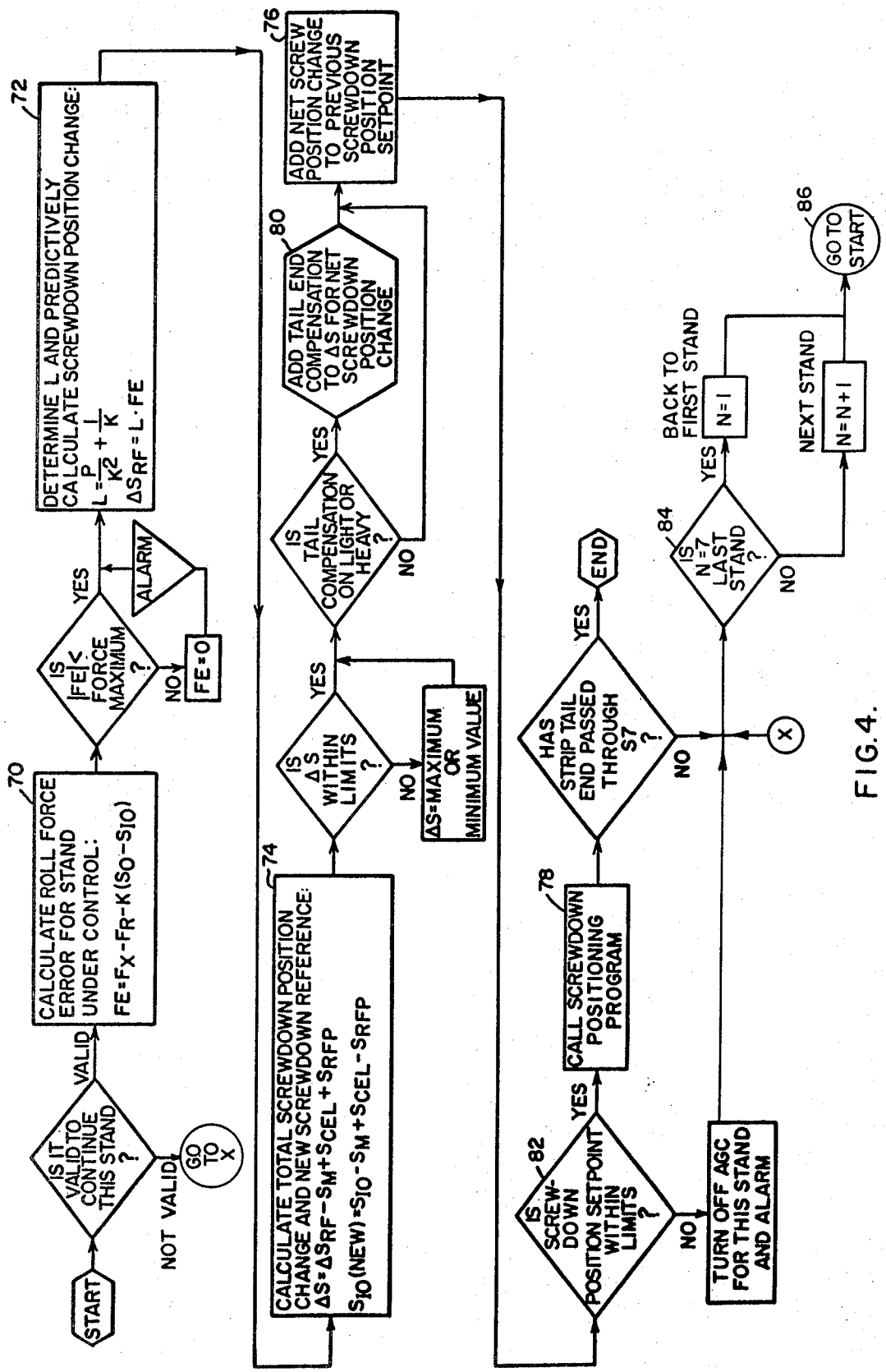
FIG. 4 shows another portion of the automatic gauge control logic flow diagram employed with the portion shown in FIG. 3 to predict corrective screwdown movement values.

The basic logic flow steps related to control action determination in the AGC program are illustrated in FIG. 3 and FIG. 4. Generally, the Eggers and Csonka approach involving Equation (3) is employed and no use is made of Equation (13) per se. Further, the workpiece plasticity is automatically determined in the manner previously indicated as being preferred herein, i.e. by means of roll force gauge determinations during the entire workpiece rolling period.

Once a start determination and validity determination have been made for control action at a particular stand, the roll force error is calculated as indicated by the reference character 70. If the calculated roll force error is less than a predetermined maximum, it is multiplied by the quantity $L$ as indicated by the reference character 72 to determine a predicted screwdown position change required for roll force error compensation. The quantity $L$ is thus in effect a component of the overall roll force gauge control system gain and its improved automatic online determination lays a foundation for improved gain tuning, etc. as previously described. In predicting corrective screwdown position change, the value of $L$ is calculated from the workpiece plasticity $P$ AND the spring constant $K$.

The workpiece plasticity is automatically determined for each roll force controlled stand throughout the workpiece length as illustrated more specifically by a subroutine diagram 75 in FIG. 3. Roll force and screwdown position data are appropriately determined and used in calculating stand entry and delivery gauges and in turn the workpiece plasticity. The applicable spring constants $K(N)$ and $K(N-1)$ are obtained from storage in accordance with the roll force operating level. The subroutine 75 is executed each time the AGC program is executed and the flow step 72 (i.e. calculation of $L$ and $\Delta S_{RF}$) is performed to determine screwdown control action at each roll force controlled stand. subsequently The subroutine 75 or the like can if desired be used in tandem or reversing mills for initialization only, i.e. to determine $P$ values at workpiece rolling startup with $P$ values subsequencly adaptively determined as described in the aforementioned Smith application entitled "Predictive Gauge Control Method and Apparatus With Adaptive Plasticity Determination For Metal Rolling Mills." Among other alternates, $P$ tables can be used for initialization and the subroutine 75 or the like can be subsequently used for automatic determination of the $P$ values. Another feasible variation is to make $P$ determinations by the calculation procedure described herein and to use such determinations only if they fall within certain limits and to use table or other stored values if they fall outside the limits. In any case, it may be desirable to make $P$ calculations on a scheduled basis other than that implicit in periodic execution of the AGC program.

The screwdown movement or position change calculation for roll force error compensation produces a one-step feedforward correction. In the roll force error calculation in block 70, anticipation is used to prevent the correction from being repeated by a positive roll force feedback as previously described in connection with the explanation of Equation (9).

If a predicted screwdown position change does not correct a roll force error as predicted, some small roll force error remains and in effect it is treated as a new roll force error. In practice, the analog scan rate would usually be faster than the rate at which screwdown movement can be made to compensate for at least some and probably most roll force errors, and the particular roll force error calculated in the block 70 at any particular point in time can thus comprise a portion of a previous roll force force error still uncorrected, a new roll force error, a roll force error remaining after screwdown movement because of some inaccuracy in the predictive calculation, or some combination of these errors.

To determine the total screwdown position change required for gauge control action, screwdown position change calculated by execution of the screwdown offset program is combined with the quantity $\Delta S_{RF}$ as indicated by the reference character 74. In turn, the total screwdown position change $\Delta S$ is checked to determine whether it is within limits and, subject to further adjustment as indicated by the reference character 80, it is added to the previous screwdown position setpoint to obtain a new position setpoint as indicated by the reference character 76. The new screwdown position setpoint is used in the screwdown positioning program as indicated by the reference character 78.

In the special situation where the tail end of the strip 14 goes through each stand, tail end compensation is added to $\Delta S$ in the block 80 in order to obtain a net screwdown position change. It is also noted that the calculated screwdown position setpoint is checked to determined whether it is within limits as indicated by the reference character 82 prior to the call for the screwdown positioning program.

After execution of the AGC program for the current stand, the execution of the AGC program is repeated for the next stand as indicated by the reference characters 84 and 86. In one invention application, AGC program execution occurs for each of the seven mill stands S1—S7 once every 0.2 seconds, i.e. at the analog scan rate for the roll force signals from the load cells 34.

It is also noted that the AGC program is instrumental in effecting anticipatory control in tandem mill looper tension control systems. Thus, gauge correcting changes in screwdown setting cause changes in mass flow which would ultimately be taken up by changes in the height of the interstand strip loops, and these loop height changes would be detected by the looper controls to effect linear speed corrections leading to restoration of proper looper conditions. The AGC program includes appropriate logic for determining feedforward control actions such as actions directly applied to the speed controls in order to speed up the respective stand speed adjustment needed in response to screwdown changes.

When the screwdown positioning program is executed in response to a call from the AGC program, the present screwdown position and the screwdown position setpoint are compared for the particular stand under control and an output is developed to operate the stand screwdown motors with an optimum or critical damping screwdown position-time curve in accordance with the total amount of screwdown movement to be effected. As the screws approach the predicted corrective screwdown position, the screwdown motors are slowed down with critical damping. Normally, the speed-time and position-time screwdown motor curves which provide critical damping response to differing amounts of screwdown position error are determined empirically for each stand or partly empirically and partly by calculation for each stand.

In summary, a process control system is uniquely organized to provide improved metal rolling mill gauge control performance. The control system preferably includes a digital computer system which provides predictive roll force gauge control operation of the screwdowns at each of one or more roll force gauge control stands in the mill as the workpiece plasticity and mill spring constant values undergo change. Improved stand gain tuning is achieved by the predictive nature of the control operation and by the automatic nature of workpiece plasticity determination and in turn faster, more accurate and more stable stand gauge control and reduced transport delayed monitor control action are achieved. Use of the process control system ultimately provides improved product gauge uniformity and improved mill productivity.

The foregoing description has been presented only to illustrate the principles of the invention. Accordingly, it is desired that the invention not be limited by the embodiment described, but, rather, that it be accorded an interpretation consistent with the scope and spirit of its broad principles.

I claim:

1. A gauge control system for a rolling mill having at least one rolling stand with a screwdown controlled roll opening through which a workpiece is transported, said system comprising means for detecting roll force at the rolling stand, means for detecting the rolling stand screwdown position, means for determining roll force error on the basis of detected roll force and screwdown position values and predetermined roll force and screwdown position reference values, means for determining screwdown movement to provide for correct gauge, said screwdown movement determining means including means for predictively determining the amount of screwdown movement needed for correcting determined roll force error in accordance with a predetermined relationship with predetermined online variables including stand entry and delivery gauges, said screwdown movement determining means further including means responsive to predetermined mill variables for making online determinations of stand entry and delivery gauges at least during a portion of the workpiece rolling period, and means for controlling screwdown position to effect corrective screwdown movement.

2. A gauge control system for a rolling mill having at least one rolling stand with a screwdown controlled roll opening through which a workpiece is transported, said system comprising means for detecting the rolling stand screwdown position, means for making an error determination representative of workpiece gauge error, means for determining screwdown movement to provide for correct gauge, said screwdown movement determining means including means for predictively determining the amount of screwdown movement needed for correcting said error determination in accordance with a predetermined relationship with predetermined online variables including stand entry and delivery gauges, said screwdown movement determining means further including means responsive to predetermined mill variables for making online determinations of stand entry and delivery gauges at least during a portion of the workpiece rolling period, and means for controlling screwdown position to effect corrective screwdown movement.

3. A gauge control system for a rolling mill having at least one rolling stand with a screwdown controlled roll opening through which a workpiece is transported, said system comprising means for detecting roll force at the rolling stand, means for detecting the rolling stand screwdown position, means for determining roll force error on the basis of detected roll force and screwdown position values and predetermined roll force and screwdown position reference values, means for determining screwdown movement to provide for correct gauge, said screwdown movement determining means including means for predictively determining the amount of screwdown movement needed for correcting determined roll force error in accordance with a predetermined relationship with determined roll force error and predetermined values of workpiece plasticity and the stand spring constant, said screwdown movement determining means including means responsive to predetermined mill variables for making online determinations of the workpiece plasticity at least during a portion of the workpiece rolling period, and means for controlling screwdown position to effect corrective screwdown movement.

4. A gauge control system as set forth in claim 3 wherein said workpiece plasticity determining means operates in response to stand roll force and stand entry and delivery gauge determinations, and means for making said entry and delivery gauge determinations from corresponding screwdown position and roll force data.

5. A gauge control system as set forth in claim 3 wherein said workpiece plasticity determining means is operative substantially throughout the workpiece rolling period.

6. A gauge control system as set forth in claim 3 wherein the rolling mill is a tandem mill having a plurality of roll force gauge controlled stands, at least one of each of said detecting means is provided for each of the roll force gauge controlled stands, said roll force error and screwdown movement determining means determine roll force error and predictively determine roll force corrective screwdown movement for each of the roll force gauge controlled stands, said plasticity determining means makes online plasticity determinations for each of the roll force gauge controlled stands, and said screwdown controlling means makes corrective screwdown movement at the corresponding roll force gauge controlled stands.

7. A gauge control system as set forth in claim 3 wherein said determining means include a digital computer system, said computer system having an input coupled to said detecting means and an output coupled to said screwdown controlling means, and means for operating said computer system to make the roll force error and workpiece plasticity and screwdown movement determinations.

8. A gauge control system as set forth in claim 4 wherein roll force corrective screwdown movement is determined from roll force error and the quantity $$\frac{P}{K^2}+\frac{1}{K}$$

where $P$ equals the workpiece plasticity in units of force divided by units of distance and $K$ equals the stand spring constant in units of force divided by units of distance, the workpiece plasticity being determined during said workpiece rolling period portion in accordance with the equation $$P=\frac{F}{H_e-H_d}$$

where $F$ equals the stand roll force and $H_e$ equals the stand entry gauge and $H_d$ equals the stand delivery gauge.

9. A gauge control system as set forth in claim 8 wherein the quantity $H_e$ is equal to $$S_o(N-1)+\frac{F(N-1)}{K(N-1)}$$

and $H_d$ is equal to $$S_o(N)+\frac{F(N)}{K(N)}$$

where $S_o(N-1)$ and $S_o(N)$ are the screwdown positions and $F(N-a01)$ and $F(N)$ are the roll forces and $K(N-1)$ and $K(N)$ are the spring constants associated respectively with a next previous workpiece rolling operation $(N-1)$ and the present workpiece rolling operation $N$.

10. A gauge control system as set forth in claim 8 wherein said determining means include a digital computer system, said computer system having an input coupled to said detecting means and an output coupled to said screwdown controlling means, and means for operating said computer system to determine the plasticity $P$ and to determine roll force corrective screwdown movement form the product of determined roll force error and the quantity $$\frac{P}{K^2}+\frac{1}{K}.$$

11. A method for providing gauge control in a rolling mill having at least one rolling stand with a screwdown controlled roll opening through which a workpiece is transported, the steps of said method comprising detecting roll force at the rolling stand, detecting the rolling stand screwdown position, determining roll force error on the basis of detected roll force and screwdown position values and predetermined roll force and screwdown position reference values, determining corrective screwdown movement to provide for correct gauge, said corrective screwdown movement step including predictively determining the amount of roll force corrective screwdown movement in accordance with a predetermined relationship with determined roll force error and predetermined values of the workpiece plasticity and the stand spring constant, determining workpiece plasticity in response to preselected online determined mill variables at least during a portion of the workpiece rolling period, and controlling screwdown position to effect corrective screwdown movement.

12. A gauge control system as set forth in claim 2 wherein screwdown movement for correcting said error determination is determined from quantities including a quantity corresponding to the quantity $$\frac{P}{K^2}+\frac{1}{K}$$

where $P$ equals the workpiece plasticity in units of force divided by units of distance, the workpiece plasticity being determined in accordance with the equation $$P=\frac{F}{H_e-H_d}$$

where $F$ equals the stand roll force and $H_e$ equals the stand entry gauge and $H_d$ equals the stand delivery gauge.

13. A method for operating a programmed digital computer system employed in a control system for a rolling mill having at least one rolling stand with a screwdown controlled opening through which a workpiece is transported, the programmed computer operating steps of said method comprising determining roll force error on the basis of detected roll force and screwdown position values and on the basis of predetermined roll force and screwdown position reference values, determining screwdown movement needed to provide for correct gauge, said screwdown movement determining step including determining the amount of screwdown movement needed for correcting determined roll force error in accordance with a predetermined relationship with predetermined online variables including stand entry and delivery gauge, and determining stand entry and delivery gauges in response to predetermined mill variables at least during a portion of the workpiece rolling period.

14. A method for operating a programmed digital computer system employed in a control system for a rolling mill having at least one rolling stand with a screwdown controlled opening through which a workpiece is transported, the programmed computer operating steps of said method comprising determining roll force error on the basis of detected roll force and screwdown position values and on the basis of predetermined roll force and screwdown position reference values, determining screwdown movement needed to provide for correct gauge, said screwdown movement determining step including determining the amount of screwdown movement needed for correcting determined roll force error in accordance with a predetermined relationship with determined roll force error and predetermined values of workpiece plasticity and the stand spring constant, and determining the workpiece plasticity in response to predetermined mill variables at least during a portion of workpiece rolling period.

15. A programmed digital computer operating method as set forth in claim 14 wherein the roll force corrective screwdown movement determining step includes determining screwdown movement from roll force error and the quantity $$\frac{P}{K^2}+\frac{1}{R}$$

where $P$ equals the workpiece plasticity in units of force divided by units of distance and $K$ equals the stand spring constant in units of force divided by units of distance, determining workpiece plasticity during the workpiece rolling period portion in accordance with the equation $$P=\frac{F}{H_e-H_d}$$

where $F$ equals the stand roll force and $H_e$ equals the stand entry gauge and is equal to $$S_o(N-1)+\frac{F(N-1)}{K(N-1)},$$

where $H_d$ equals the stand delivery gauge and is equal to $$S_o(N)+\frac{F(N)}{K(N)},$$

where $S_o(N-1)$ and $S_o(N)$ are the screwdown positions and $F(N-a01)$ and $F(N)$ are the roll forces, and where $K(N-1)$ and $K(N)$ are the spring constants associated respectively with a next previous workpiece rolling operation $(N-1)$ and the present workpiece rolling operation $N$.